United States Patent
Liang et al.

(10) Patent No.: US 6,398,233 B1
(45) Date of Patent: Jun. 4, 2002

(54) FOLDABLE STROLLER WITH SEPARABLE INFANT CARRIER

(75) Inventors: Hsiu-Chiang Liang, Ping-Tung Hsien; Er-Jui Chen, Feng-Shen, both of (TW)

(73) Assignee: Link Treasure Limited (VG)

( * ) Notice: Subject to any disclaimer, the term of this patent is extended or adjusted under 35 U.S.C. 154(b) by 0 days.

(21) Appl. No.: 09/376,667

(22) Filed: Aug. 16, 1999

(51) Int. Cl.⁷ .............................................. B62B 1/04
(52) U.S. Cl. ......................... 280/30; 280/648; 280/643
(58) Field of Search ................................ 280/647, 648, 280/649, 650, 658, 30, 31, 643, 639, 642, 641, 47.38

(56) References Cited

U.S. PATENT DOCUMENTS

| | | | | |
|---|---|---|---|---|
| 5,244,228 A | * | 9/1993 | Chiu | 280/642 |
| 5,676,386 A | * | 10/1997 | Huang | 280/643 X |
| 5,727,798 A | * | 3/1998 | Walters et al. | 280/30 |
| 5,772,279 A | * | 6/1998 | Johnson, Jr. | 280/30 X |
| 5,794,951 A | * | 8/1998 | Corley et al. | 280/648 X |
| 5,823,547 A | * | 10/1998 | Otobe et al. | 280/30 |
| 5,845,924 A | * | 12/1998 | Huang | 280/642 |
| 5,845,925 A | * | 12/1998 | Huang | 280/642 |
| 5,865,447 A | * | 2/1999 | Huang | 280/30 |
| 5,876,057 A | * | 3/1999 | Huang | 280/642 |
| 6,070,890 A | * | 6/2000 | Haut et al. | 280/643 X |

* cited by examiner

Primary Examiner—J. J. Swann
Assistant Examiner—F. Zeender
(74) Attorney, Agent, or Firm—W. Wayne Liauh (57) ABSTRACT

The present invention relates to a foldable stroller with separable infant carrier, comprising a foldable stroller, a front protect frame slidably connected with the stroller and a infant carrier which can be either a safety seat or a seat of a stroller. The front protect frame changes in accordance with the changing of positions of stroller from using, unfolded, to parking, folded, and is mounted by the infant carrier for fixing position when the stroller is on using position.

5 Claims, 11 Drawing Sheets

FOLDABLE STROLLER WITH SEPARABLE INFANT CARRIER

FIELD OF THE INVENTION

The present invention relates generally to a foldable infant stroller. More particularly, the present invention relates to a foldable infant stroller which is foldable in both front and side directions and can be mounted thereon a portable safety seat.

DESCRIPTION OF RELATED ART

There are various kinds of infant strollers in the present market. A foldable infant stroller made to decrease the occupying volume while not in use is one of them. Strollers of this kind are the most ones. They can be divided into some categories such as the following: Strollers which are complicated in structure but comfortable while using are illustrated in U.S. Pat. No. 5,876,057 and U.S. Pat. No. 5,845,924. Strollers which are simple in structure but foldable for downsizing after using and being easily portable are illustrated in U.S. Pat. No. 5,845,925 and U.S. Pat. No. 5,863,061. Foldable strollers such as those described in U.S. Pat. No. 5,876,057 and U.S. Pat. No. 5,845,924 are complicated in structure. The main structure comprises a pair of front frames, a pair of rear frames, a grasp frames and a seat frame, wherein the seat frame is located between the front and rear frames. The grasp frame and the rear frames are folded and then moved closer to the front frames when folding the stroller. That is, the infant stroller is collapsible in the side direction by getting the front and rear frames closer but can not be downsized in the front direction by getting both front and both rear frames closer, because the seat frame is constructed between them. Foldable strollers such as those described in U.S. Pat. No. 5,845,925 and U.S. Pat. No. 5,863,061 are comparatively simple in structure. The main structure comprises a pair of front frames, a pair of rear frames, a pair of grasp frames and a pair of seat frames, wherein the seat is formed by directly putting a cloth between the front and rear frames. Both front frames and rear frames are collapsible in both front direction and side direction for further downsizing. Thus, this kind of stroller is simpler and lighter and easy to carry out, which is generally called the umbrella stroller.

In many countries, the infant is obliged to seated in an auxiliary safety seat while transporting it by automobiles under some regulations. The adult must take an auxiliary safety seat for transporting the baby and a stroller for walking the baby around after arrival. In the case of taking a public transportation, for example a bus, it becomes more annoying that the adult must put the infant readily on the stroller first, push the stroller with one hand and then carry the auxiliary safety seat with another hand. Therefore, to carry both the auxiliary safety seat and the stroller is commonly encountered. Most of the parents choose an umbrella stroller with small and light characteristics to lessen their carrying burdens.

Referring to U.S. Pat. No. 5,823,547, for example, it disclosed a child safety seat, which comprises a seat provided for carrying a child having a seat belt on it and a foldable wheeled member connected under the seat provided for staying on one position to facilitate using as a child safety seat and another position to facilitate using as a stroller. With these elements, this child a safety seat combines the functions of both safety seat and a stroller together in order to solve the aforementioned annoying carrying problems. Unfortunately, this child safety seat only combined both safety seat and stroller functions, but did not allow simultaneous use of both functions impossible. Furthermore, the seat element of it is not foldable, which may not be suitable for a parent who only needs only one stroller that is both small and light-weight.

Referring to U.S. Pat. No. 5,727,798, it disclosed a child stroller and infant carrier system, which comprises a front safety rod on which an infant carrier separably placed from it. However, this foldable stroller is still complicated in structure. When the functions of both stroller and infant carrier are needed simultaneously, this kind of structure is not suitable anymore. Accordingly, the umbrella stroller disclosed in U.S. Pat. No. 5,845,925 and U.S. Pat. No. 5,863,061, both have a pair of front and rear frames which can mutually moving close to each other as viewed from front face. This causes the fixed front safety rod, usually in the shape of 'U', unable to be mounted on the stroller and, thus, making them useful only as stroller and safety seat individually.

The foregoing has outlined some of the more pertinent objects of the present invention. These objects should be construed to be merely illustrative of some of the more prominent features and applications of the intended invention. Many other beneficial results can be obtained by applying the present invention so disclosed in a different manner or modifying the invention within the scope of the disclosure. Accordingly, other objects and a fuller understanding of the invention may be had by referring to the summary of the invention and detailed description of the preferred embodiment in addition to the scope of the invention as defined by the claims taken in conjunction with the accompanying drawings.

SUMMARY OF THE INVENTION

Accordingly, the present invention provides mainly a front protect structure of infant stroller, especially, a front protect structure which can change to both the use position and the parking position according to the change of the use position of the infant stroller.

In order to meet the object of the present invention, which comprising: a front protect structure connected to both front frames. The front protect structure further comprises a pair of handrails, a pair of supporting frames and a connecting rod, wherein the connecting rods are movably connected between these two supporting rods. When the stroller is folded from left to right, or from right to left, the supporting rods slide along the connecting rods connecting with and get closer to each other. Similarly, when the stroller is unfolded from left to right, or from right to left, the supporting rods slide along the connecting rods connecting with and leave from each other, and the connecting rod is connected to the supporting rods to form the front protect frame of the stroller.

Another object of the present invention is to provide a stroller structure which can be mounted with a automobile safety seat thereon and thus providing the dual functions of automobile safety seat and stroller. The stroller has a front protect frame provided for the alternative mounting of the automobile safety seat. Infants are put on safety seat when they are transported by vehicle and are still keep on the safety seat by putting the safety seat directly on the stroller. The stroller is still the moving vehicle of carrying the infant. Therefore, parents can choose a stroller having simple structure to accompany with a safety seat when going outside. The stroller and the safety seat unquestionably can also be use individually.

The foregoing has outlined rather broadly the more pertinent and important features of the present invention in order that the detailed description of the invention that follows may be better understood so that the contribution of the present invention to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purpose of the present invention. It should also be realized by those skilled in the art that such equivalent methods and structures do not depart from the spirit and scope of the invention as set forth in the appended claims.

DETAILED DESCRIPTION OF THE PREFERRED EMBODIMENT

Embodiments of the present invention provide a stroller structure which can be folded from both front face and lateral face.

Figure 1:
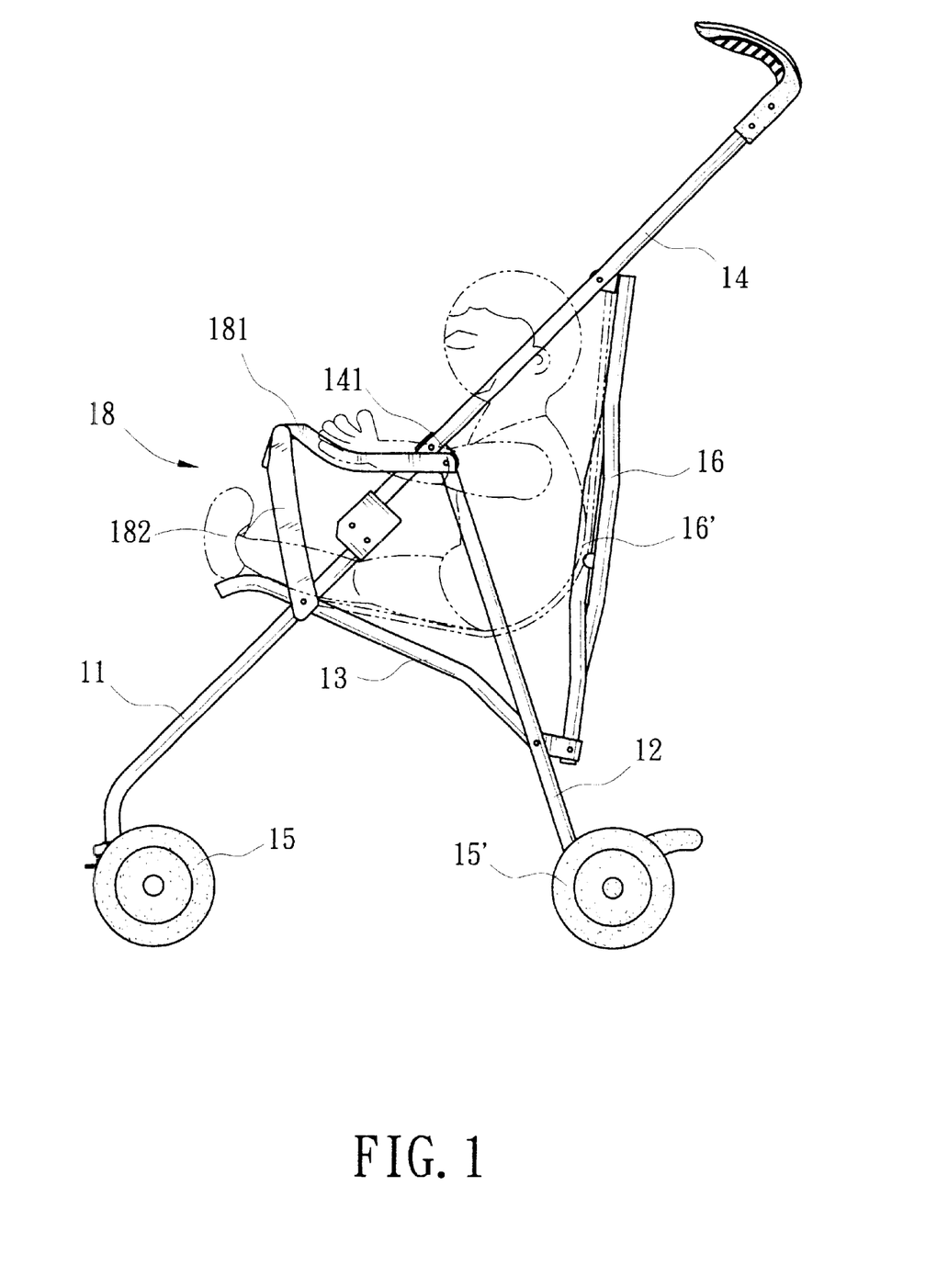
FIG. 1 is a side view of the embodiment of the present invention.

Firstly, referring to FIG. 1 which is a side view of the present invention comprising a pair of front frames 11, a pair of rear frames 12, a pair of seat frames 13 and a pair of grasp frames 14.

The front frame 11 has a wheel 15 connected under its bottom and a grasp frame 14 connected at its end. The grasp frame 14 pivotally connects to a pivot member 141 which, in turn, connects to the rear frame 12. The rear frame 12 also has a wheel 15' connected under its bottom. The seat frame 13 is connected between the front frame 11 and rear frame 12. Two grasp frames 14 and two rear frames 12 are connected by two connecting rods 16 and 16' which are pivotally interconnected in their intermediate portions. An infant seat, not shown in the fig., is formed by putting a piece of cloth coating on between front and rear frames 11, 12 and seat frame 13. The stroller 1 can change between the using position, unfolded status, and the parking position, folded status. In the parking position, the front frame 11 and the rear frame 12 come closer laterally and come from left to right, or right to left, as viewed from the front face.

Figure 2:
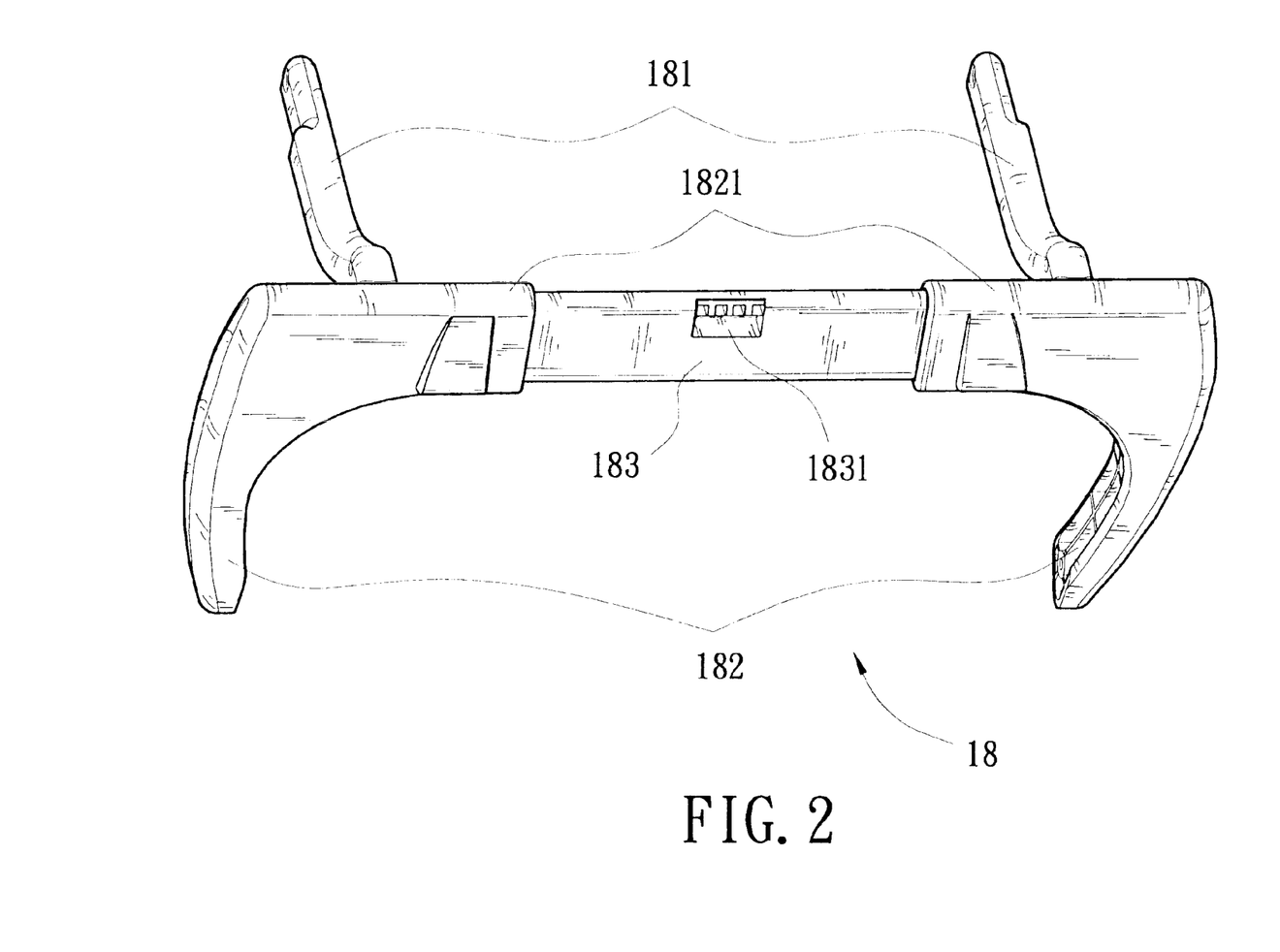
FIG. 2 is an enlarged perspective view of the front frame structure of the present invention.
Figure 3:
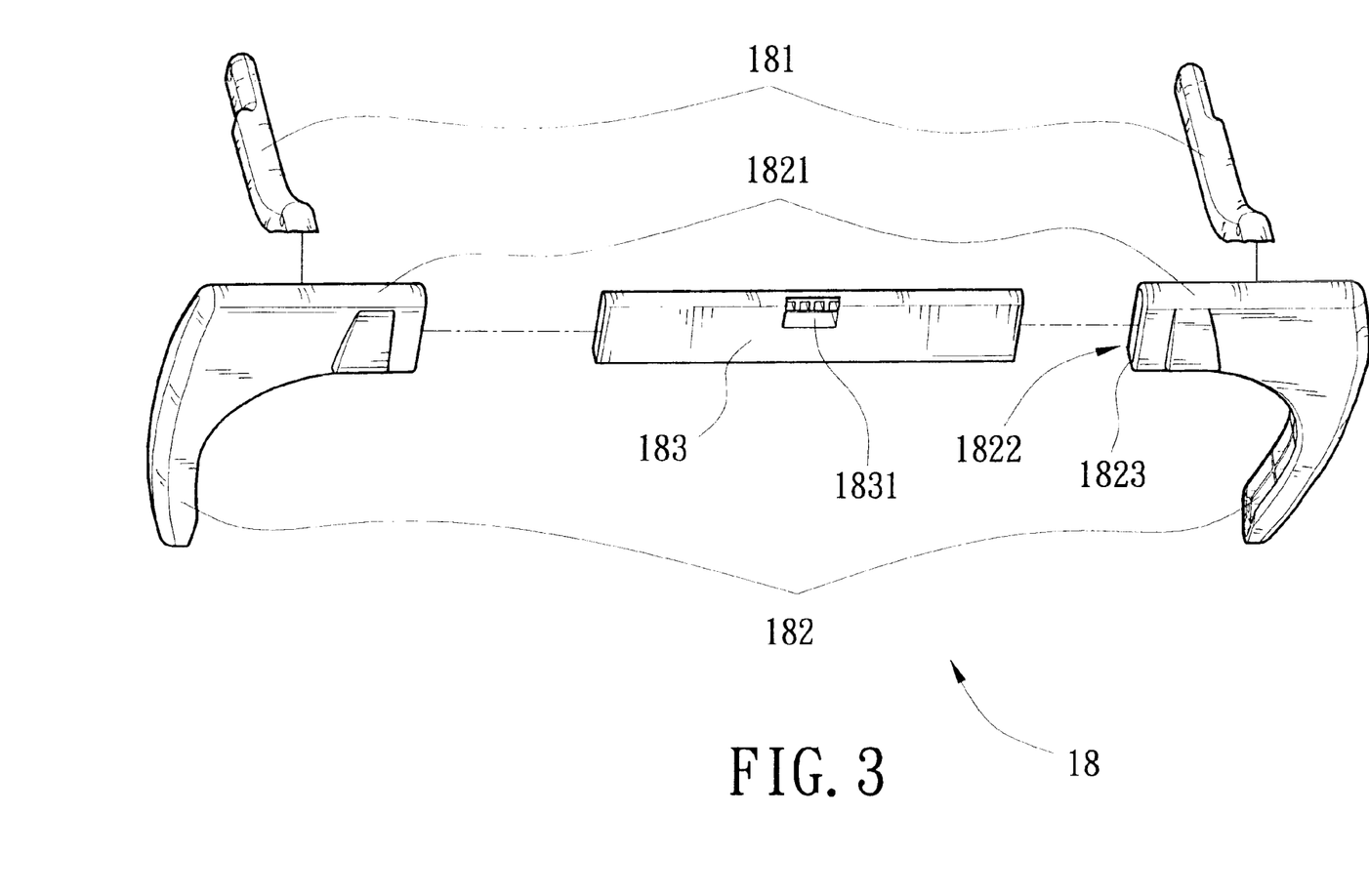
FIG. 3 is an exploded perspective view of the front frame structure of the present invention.
Figure 4:
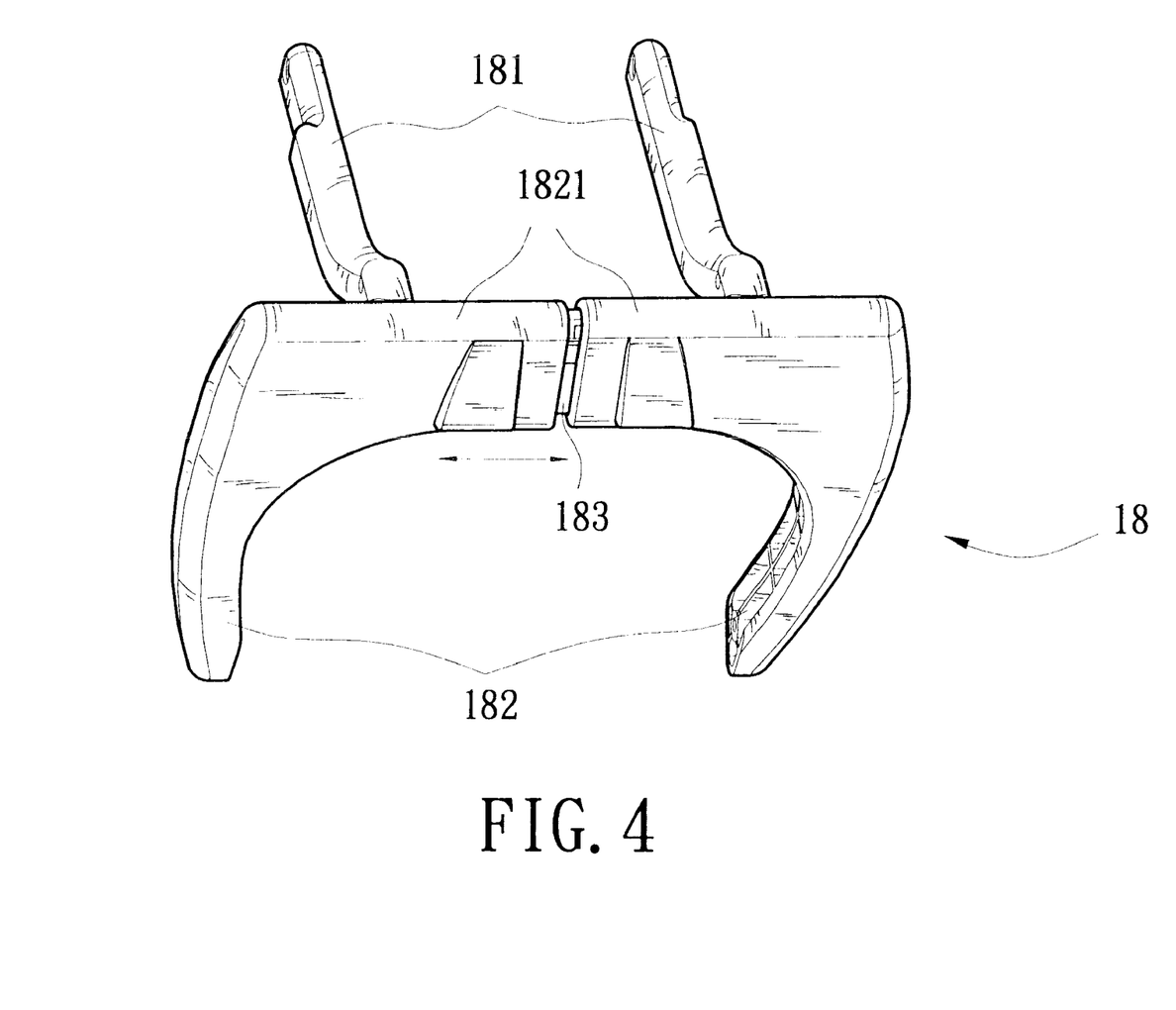
FIG. 4 is an enlarged perspective view of the front frame structure of the present invention, depicting the folded status.
Figure 5A:
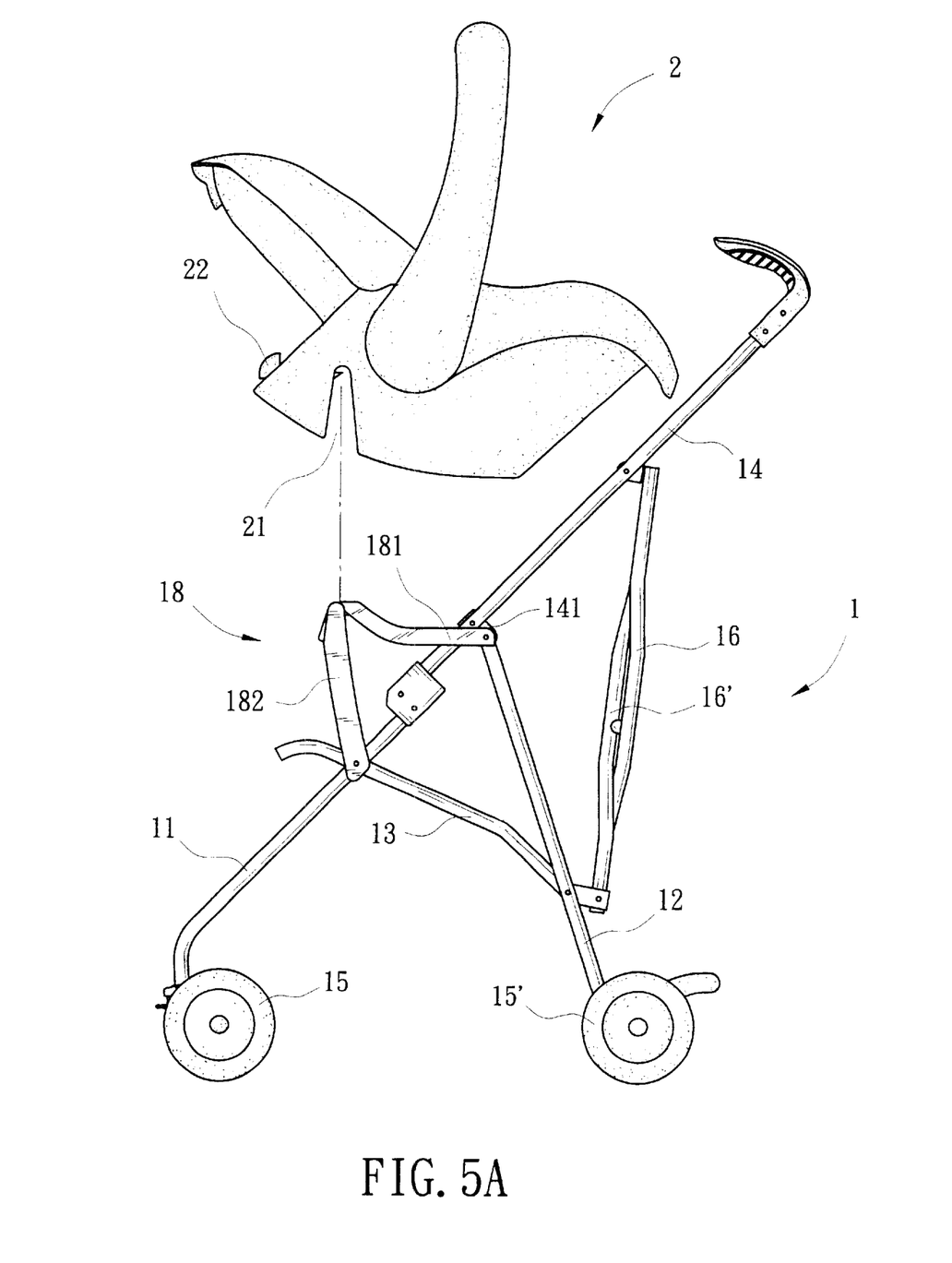
FIG. 5A is an exploded side view of the automobile safety seat and the stroller of the present invention.
Figure 5B:
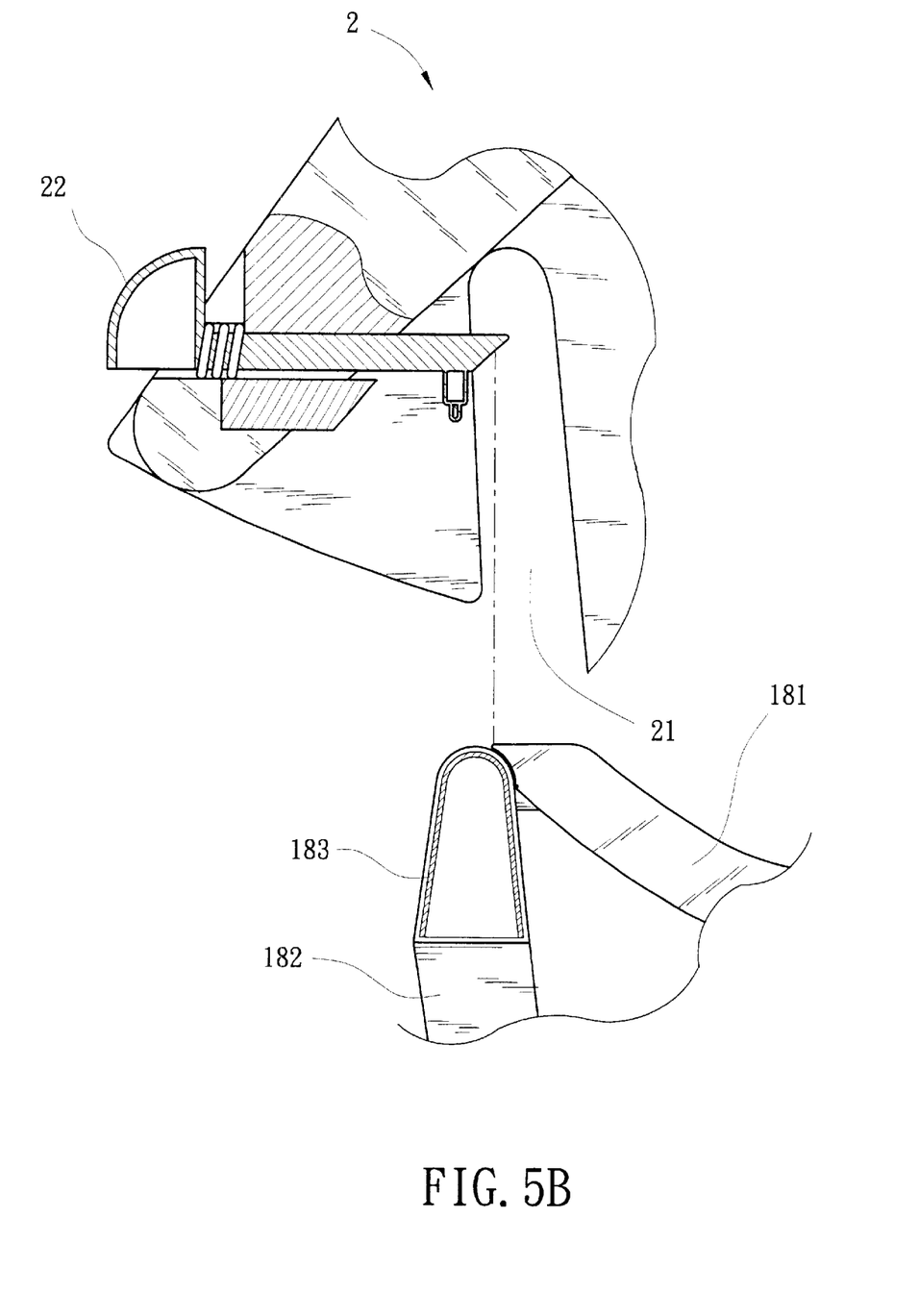
FIG. 5B is an enlarged cutting view of a portion of the automobile safety seat and the stroller of the present invention.
Figure 6A:
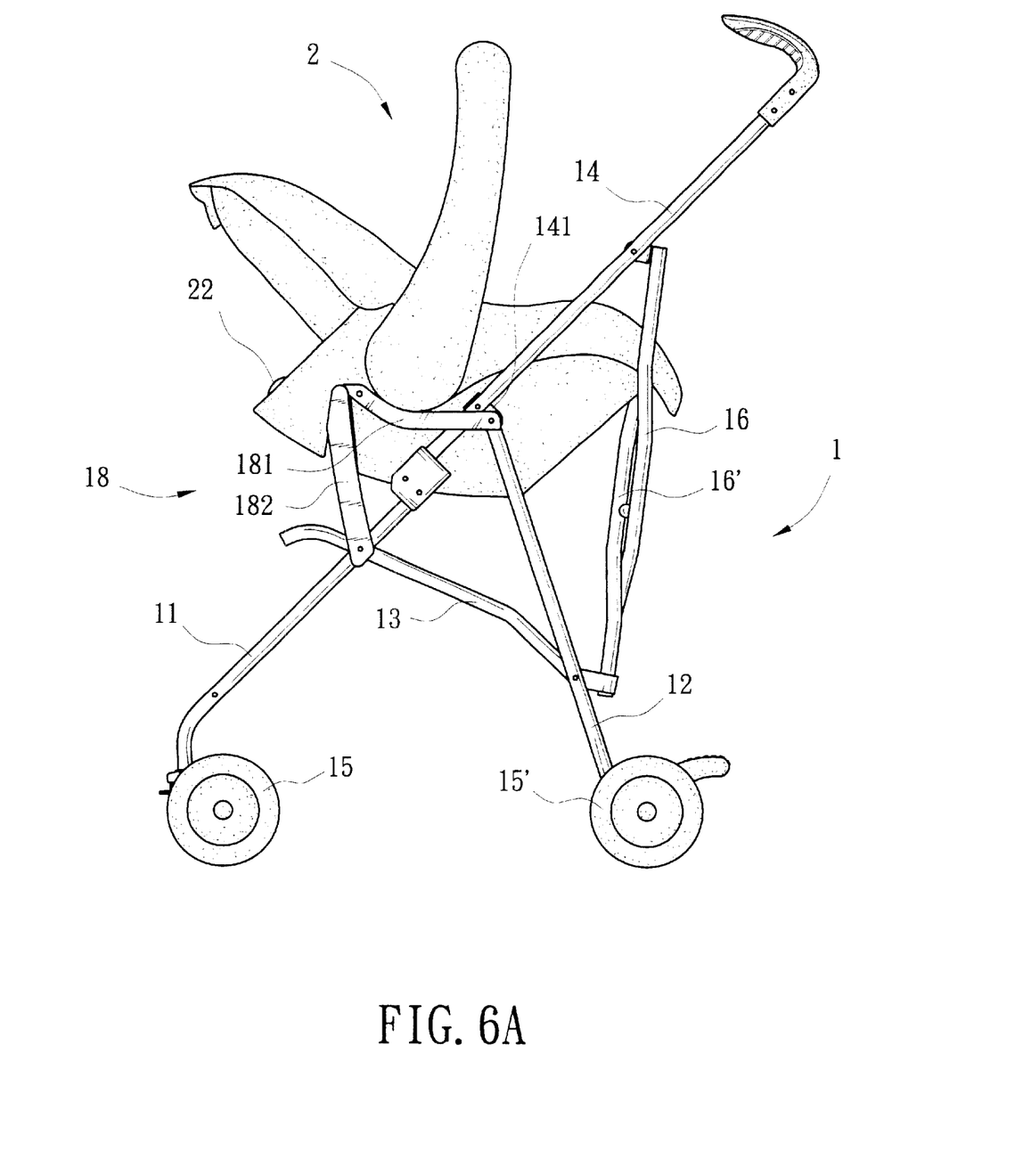
FIG. 6A is a side view of the automobile safety seat and the stroller of the present invention, depicting the composing status.
Figure 6B:
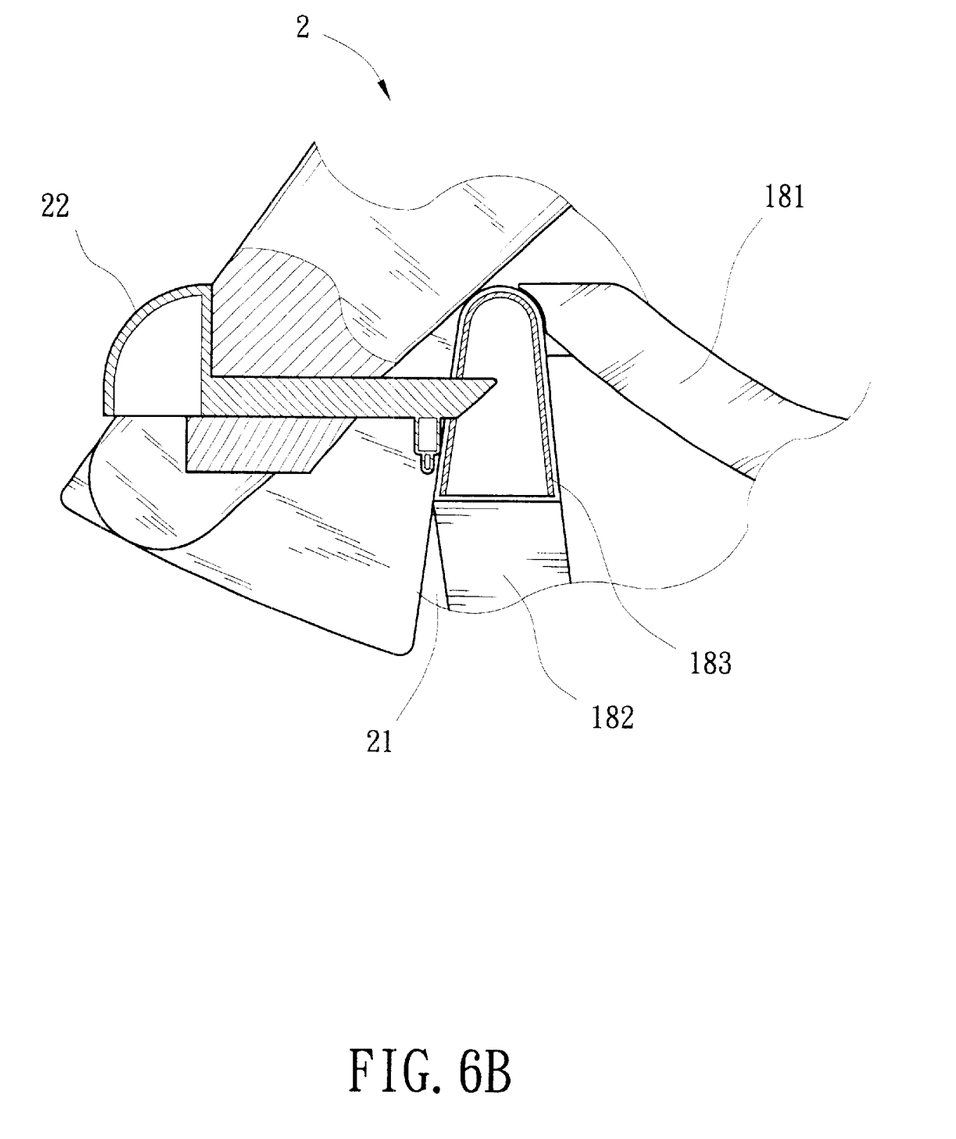
FIG. 6B is a cutting view of a portion of the automobile safety seat and the stroller of the present invention, depicting the composing status.

Referring to FIGS. 2, 3 and 4, the present invention further comprises a front protect frame 18 which is connected between the front frame 11 and the rear frame 12. The front protect frame 18 comprises a pair of handrail frames 181, a pair of supporting frames 182 and a connecting rod 183. The supporting frame 182 pivotally connects to the pivot of the front frame 11 and the seat frame 13 at one end. The handrail frame 181 pivotally connects to the rear frame 12 near the grasp frame 14 at one end and to supporting frame 182 at the other end. The supporting frame 182 has a connecting portion 1821 having a hollow space 1822 and an open end 1823. When two supporting frames 182 are connected to the front frame 11 separately, these two open ends 1823 of the hollow space 1822 are toward to each other. The connecting rod 183 is located between these two supporting frames 182 and has its two ends slidably inserted into the open ends 1823 of these two supporting frames 182. When the front frames 11 and the rear frames 12 of the stroller 1 come closer to their parking position, they become closer to each other, the supporting frames 182 also become closer to each other, and the connecting rod 183 slides into the hollow space 1822 more and more. In the same manner, when the front frames 11 and the rear frames 12 of the stroller 1 leave to their using position, the connecting rod 183 slides out from the hollow space 1822 gradually. Consequently, the stroller 1 having front protect frame 18 which changes its position according to the change of the stroller 1 has such a simple structure.

The stroller 1 having simple structure is light enough to be suitable for the parent's using of going outside or traveling. To carry an automobile safety seat 2 is usually another need. The conventional safety seat only meets the function of safety seat during transportation. When the infant leave the transporting vehicle, it must be moved to the stroller for another voyage. However, in the present invention, the infant is put on the stroller 1 without a further moving by directly put the safety seat 2 on the stroller 1. Referring to FIGS. 5A, 5B, 6A and 6B, the connecting rod 183 of the front protect frame 18 has a hook open 1831, while the automobile safety seat 2 has an imbed trough 21 and a locker 22. The imbed trough 21 can be site across the connecting portion 1821 of the supporting rod 182 of the front protect frame 18. When the imbed trough 21 is put seated on the front frame 18, the locker 22 is right match the hook open 1831. Under this designed structure, the locker 22 can firmly lock onto the hook open 1831 of the connecting rod 183 in case that the safety seat 2 is been put onto the infant stroller 1 for transportation.

Figure 7A:
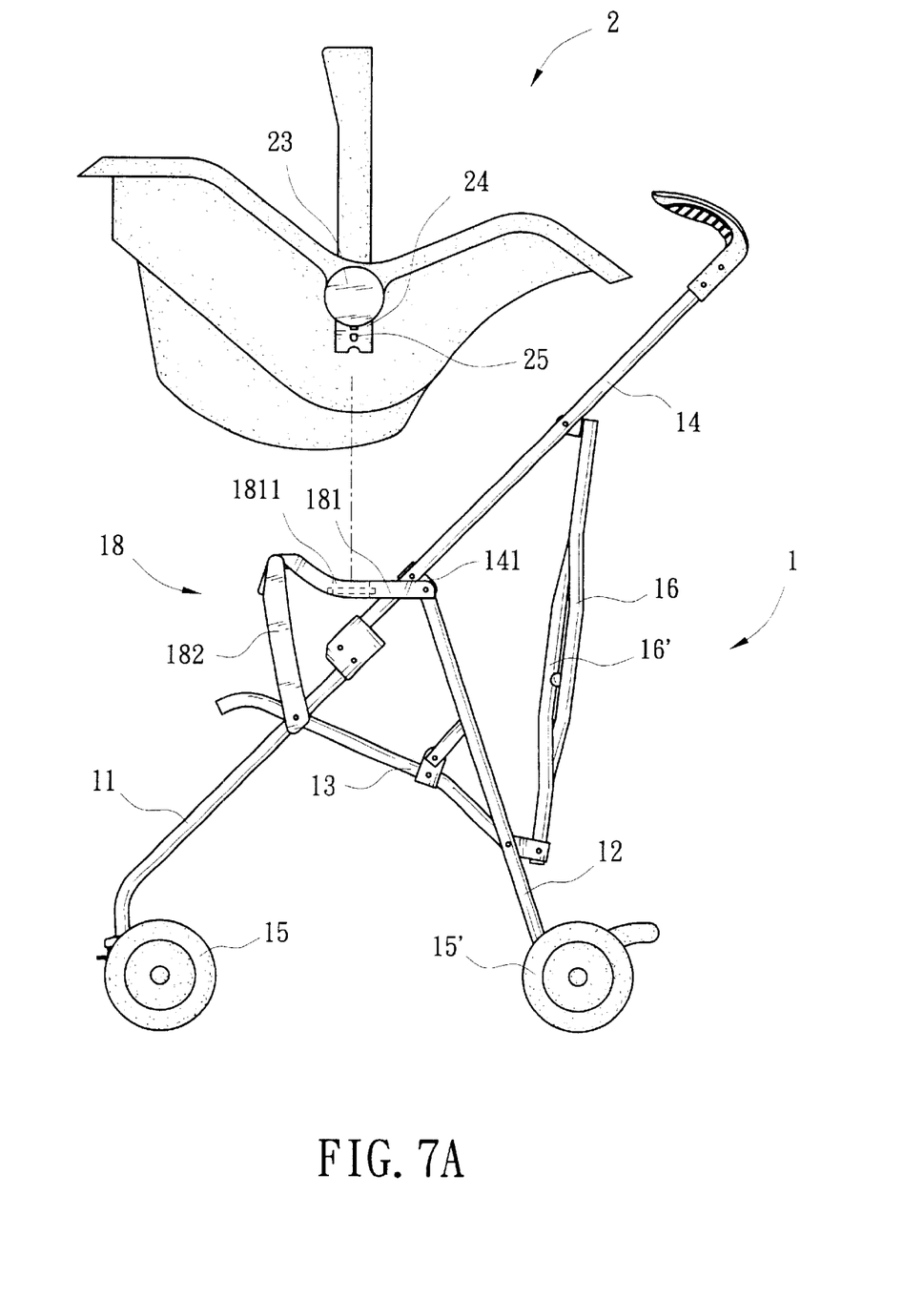
FIG. 7A is a side view of another embodiment of the present invention.
Figure 7B:
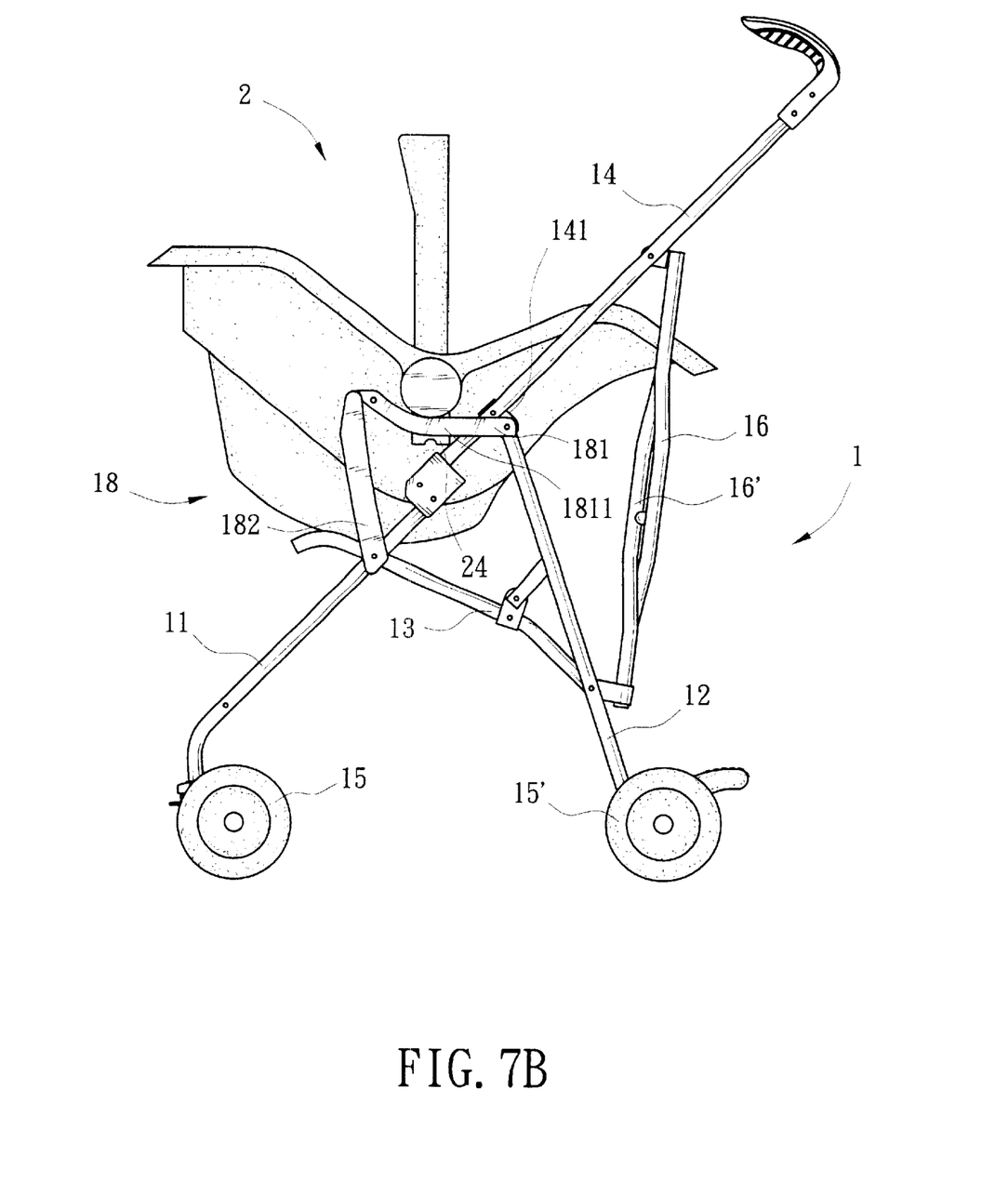
FIG. 7B is a side view of FIG. 7A, depicting the composing status.

As in FIGS. 7A and 7B, the handrail frame 181 of the front protect frame 18 of the stroller 1 has a locker 1811. The safety seat 2 has a straddle frame 23 for mounting on the handrail frame 181. The straddle frame 23 comprises a hook member 24 for locating on the handrail frame 181 and a hole 25 for been lock up by the locker 1811. When the straddle frame 23 is put seated on the handrail frame 181, the locker 1811 is right match the hole 25. Under this designed structure, the locker 1811 can firmly lock onto the hole 25 of the straddle frame 23 in case that the safety seat 2 is been put onto the infant stroller 1 for transportation.

Figure 8:
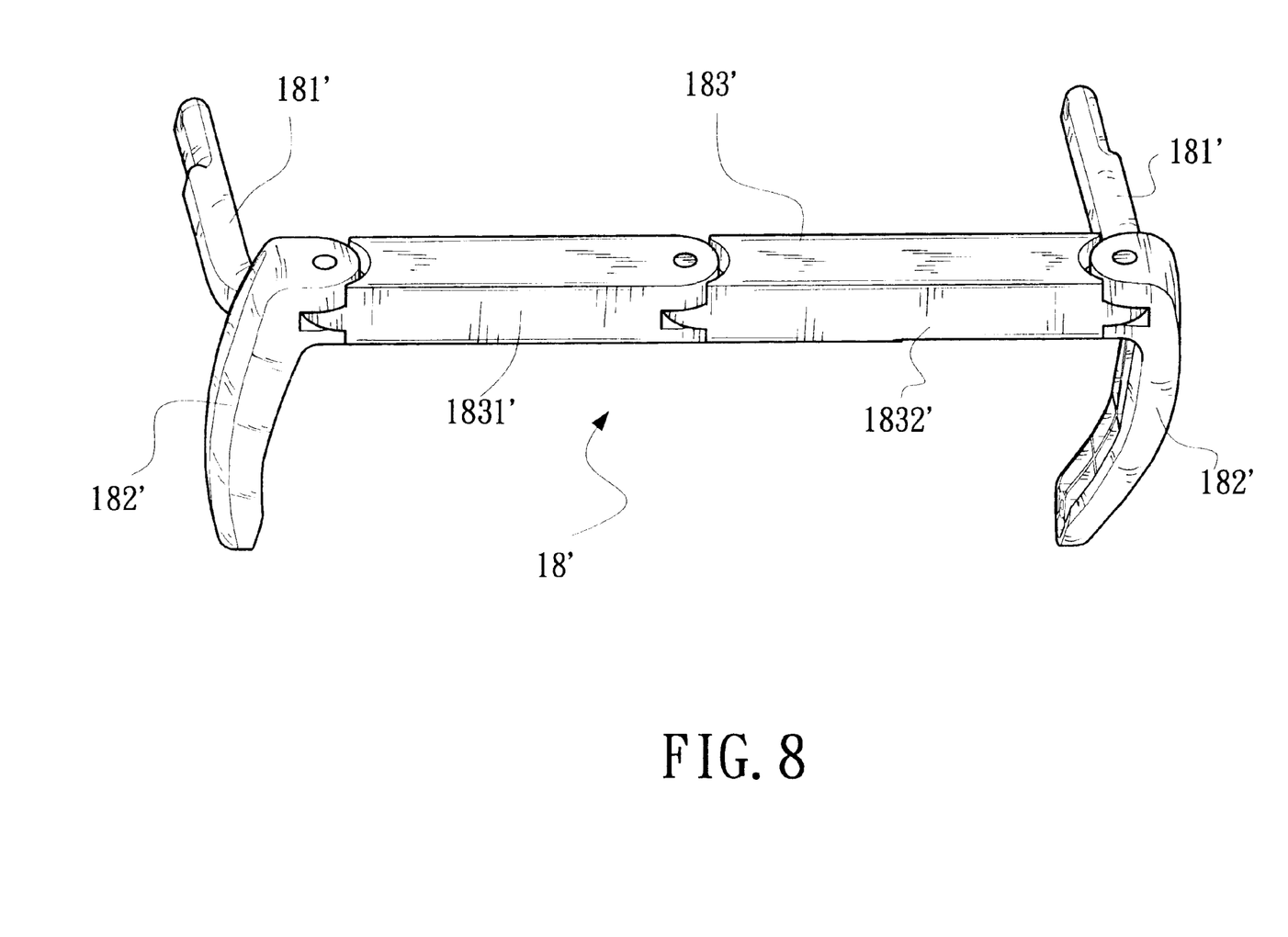
FIG. 8 is a perspective view of the front frame structure of another embodiment of the present invention.

Referring to FIG. 8, which shows another embodiment of the front protect frame 18 of the present invention. The front protection frame 18' comprises a handrail frame 181', a pair of supporting frames 182' and a connecting rod 183'. The connecting rod 183' further comprises a first rod 1831' and a second rod 1832'. The first rod 1831' and the second rod 1832' are pivotally connected at one end and connected to the supporting frame 182' separately at another end. When the stroller 1 is folding, the first rod 1831' and the second rod 1832' are also pivoting together.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described, and accordingly, all suitable modifications and equivalents may be restored to, falling within the scope of the invention.

EFFECTS OF THE INVENTION

1. Equipping the stroller with a front protect frame, which changes its status according to changes, folding or unfolding positions, of the stroller.
2. Providing a stroller structure which can be equipped with a safety seat which can be either put on the front protect frame of the stroller for accompanying use or put on a car for a single safety seat use.

Numerous variations and modifications will suggest themselves to persons skilled in the arts, other than those already described, without departing the basic inventive concepts. Although the present invention has been described with respect to typical preferred embodiments thereof, it should be understood that the present inventions is not limited to these embodiments, and various changes or modifications may be made without departing from the scope of the present invention as defined by the appended claims.

While the invention has been described in its preferred embodiments, it is to be understood that the words which have been used are words of description rather than limitation and that changes within the purview of the appended claims may be made without departing from the true scope and spirit of the invention.

What is claimed is:

1. A combined child stroller and infant carrier system, comprising:
    a stroller having a main frame, a seat for bearing an infant and a wheel member for moving the stroller, wherein the main frame has a plurality of connecting rods pivotally interconnecting with each other for undertaking changing between folding and unfolding of the stroller;
    a front protect frame which has at least one connecting portion and is located on the main frame for changing positions in accordance with the stroller; and
    an infant carrier which has a loading space for holding an infant, a seat belt for fastening the infant on the loading space and a locker for locking the infant carrier onto the front protect frame when the infant carrier is alternatively put on the stroller;
    wherein the front protect frame further comprises:
        a pair of supporting frames pivotally connected on the main frame at one end;
        a pair of handrail frames pivotally connected on the main frame at one end and on the supporting frame at the other end; and
        a connecting rod connected between the supporting frames;
    further wherein the connecting rod comprises a first rod which is pivotally connected with one of the supporting frames at one end and a second rod which is pivotally connected with the other end of the first rod at one end and pivotally connected with another of the supporting frames at the other end.

2. A combined child stroller and infant carrier system as claimed in claim 1, wherein the infant carrier has a pair of embed troughs for mounting on the front protect frame.

3. A combined child stroller and infant carrier system as claimed in claim 2, wherein each of the supporting frames having a connecting portion which has a hollow space for holding the connecting rod.

4. A combined child stroller and infant carrier system as claimed in claim 2, wherein the infant carrier having a pair of straddle frames for mounting on the handrail frames, further wherein the straddle frame having a hook member for mounting on the handrail frame and a hole for being locked with the locker.

5. A combined child stroller and infant carrier system, comprising:
    a stroller having a main frame, a seat for bearing an infant and a wheel member for moving the stroller, wherein the main frame has a plurality of connecting rods pivotally interconnecting with each other for undertaking changing between folding and unfolding of the stroller;
    a front protect frame which has at least one connecting portion and is located on the main frame for changing positions in accordance with the stroller; and
    a pair of supporting frames pivotally connected on the main frame on one end;
    a pair of handrail frames pivotally connected on the main frame at one end and on the supporting frame at the other end; and
    a connecting rod connected between the supporting frames;
    an infant carrier which has a loading space for holding an infant, a seat belt for fastening the infant on the loading space and a locker for locking the infant carrier onto the front protect frame when the infant carrier is alternatively put on the stroller;
    wherein the connecting rod comprises a first rod which is pivotally connected with one of the supporting frames at one end and a second rod which is pivotally connected with the other end of the first rod at one end and pivotally connected with another of the supporting frames at the other end.

* * * * *